May 14, 1935. J. H. BIRD 2,001,652
HOOK GUARD
Filed Aug. 14, 1934
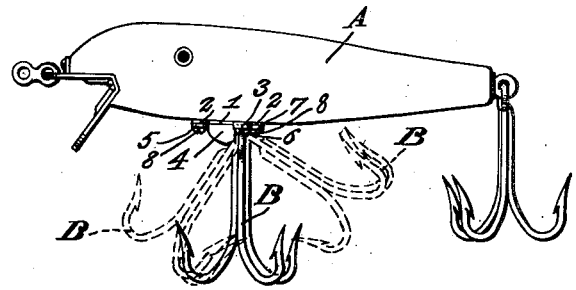
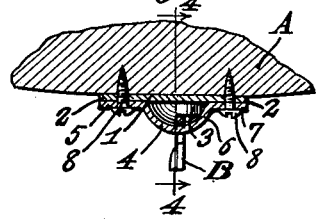
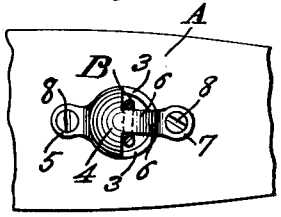
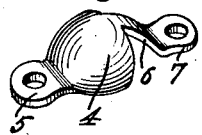
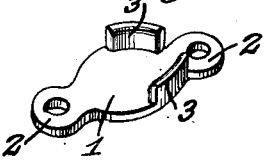
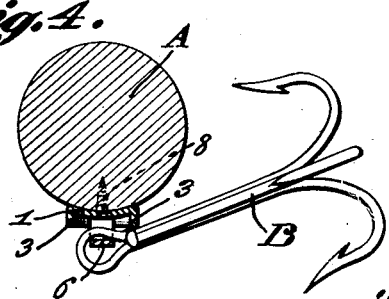
James H. Bird, INVENTOR
BY Victor J. Evans & Co.
ATTORNEY Patented May 14, 1935

2,001,652

UNITED STATES PATENT OFFICE 2,001,652

HOOK GUARD

James H. Bird, San Antonio, Tex.

Application August 14, 1934, Serial No. 739,839

2 Claims. (Cl. 43—46)

This invention relates to artificial fish bait and its general object is to provide a hook guard for an artificial minnow to prevent the hooks from contacting the body of the minnow and damaging the same, with the result that the guard will materially prolong the life of the usefulness of the minnow, as minnows now in general use have enameled surfaces which when damaged by the hooks allow water to seep into the wood or below the finish, and cause the enamel or paint to crack and scale, therefore such a minnow loses its attractiveness to fish.

A further object of the invention is to provide a hook guard that holds the hooks away from the body, thereby materially increasing their usefulness, as they cannot become bent or dull by contacting the body, nor can they become lodged in the body, and the hooks are held in proper position to make a strike, as well as to prevent unnatural action of the bait when being retrieved, yet are movable in all directions in that they are pivotally associated with the body.

Another object of the invention is to provide a hook guard that can be attached to any type of artificial bait, is simple in construction, inexpensive to manufacture, and extremely efficient in use and service.

This invention also consists in certain other features of construction and in the combination and arrangement of the several parts, to be hereinafter fully described, illustrated in the accompanying drawing and specifically pointed out in the appended claims.

In describing my invention in detail, reference will be had to the accompanying drawing wherein like characters denote like or corresponding parts throughout the several views, and in which:

Figure 1 is a side elevation of an artificial minnow showing my hook guard plate thereon.

Figure 2 is a longitudinal sectional view taken through the guard.

Figure 3 is a bottom plan view thereof.

Figure 4 is a transverse sectional view taken through the body of the minnow and the guard respectively, with the hook means in elevation.

Figure 5 is a perspective view of the outer member of the guard.

Figure 6 is a similar view of the base member.

Referring to the drawing in detail, the letter A indicates the body of a minnow having the usual water resisting means secured to the head portion thereof and which includes means for attaching the line thereto, while secured to the tail for pivotal association therewith is a cluster of hooks which together with the other elements mentioned form no part of the present invention which is confined to a hook guard for the cluster of hooks B to prevent the penetrating ends thereof from contacting the body A, but the hook guard pivotally secures the cluster B to the body intermediate its ends as clearly shown in Figure 1.

My hook guard includes a base member that is provided with a substantially disk like body 1 having formed upon diametrically opposite sides thereof, apertured ears 2, and extending at right angles to the body 1 are lugs 3 which follow the curvature of the periphery of the body 1. The lugs extend from the inner ends of one of the ears 2, to substantially midway the outer edges of the body 1, as clearly shown in Figure 6, and act as abutments for the cluster of hooks B, in that they are arranged in the path of the shank thereof as will be noted upon inspection of Figure 4.

The outer member of my hook guard includes a cup like portion 4 having formed therewith an apertured ear 5, and extending from the opposite end of the cup like portion 4 is an arm 6 that has formed thereon an apertured ear 7. The apertured ears 5 and 7 are adapted to have the apertures thereof register with the apertures of the ears 2 to receive securing means such as screws 8 in fastening the guard to the body as best shown in Figure 2 with the eye of the cluster of hooks B received by the arm 6 so that the cluster will be pivotally connected to the guard as will be apparent.

The cup like portion prevents forward movement of the cluster of hooks B, in that this portion is arranged in the path of the eye of the cluster, and the lugs 3 not only prevent contact of the penetrating points of the hooks of the cluster, with the sides of the body A but also prevent the penetrating points from contacting the bottom of the body A, as will be apparent upon inspection of Figure 1 which shows the cluster of hooks B at the limit of their forward and rearward movement, in dotted lines and in normal position in full lines, with the result that it is impossible for the hooks to contact the body, therefore damage thereto is eliminated and such will materially prolong the life of the minnow.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:

1. A hook guard for artificial bait, comprising a base member including apertured ears, an outer member including apertured ears and cooperating with the first mentioned ears for securing the guard to the body of the bait, means included in the outer member to pivotally receive the hook means, lugs formed on the base member to limit lateral and rearward movement of the hook means, and means included in the outer member to limit forward movement of the hook means so that the latter cannot contact the body.

2. A hook guard for artificial bait, comprising a base member including apertured ears, an outer member including apertured ears cooperating with the first mentioned ears, means passing through the apertured ears for securing the guard to the body of the bait, means included in the outer member to pivotally receive the hook means, a cup like portion for the outer member and arranged in the path of the hook means to limit forward movement thereof, a disk like body for the base member, and lugs formed on the disk like body and arranged at right angles with respect thereto for disposal in the path of the hook means to limit lateral and rearward movement thereof so that the hook means cannot contact the body.

JAMES H. BIRD.